April 13, 1965   W. M. MAY ETAL   3,177,969
FUEL TANK AND REAR CAB SUPPORT
Original Filed Feb. 20, 1962   3 Sheets-Sheet 3
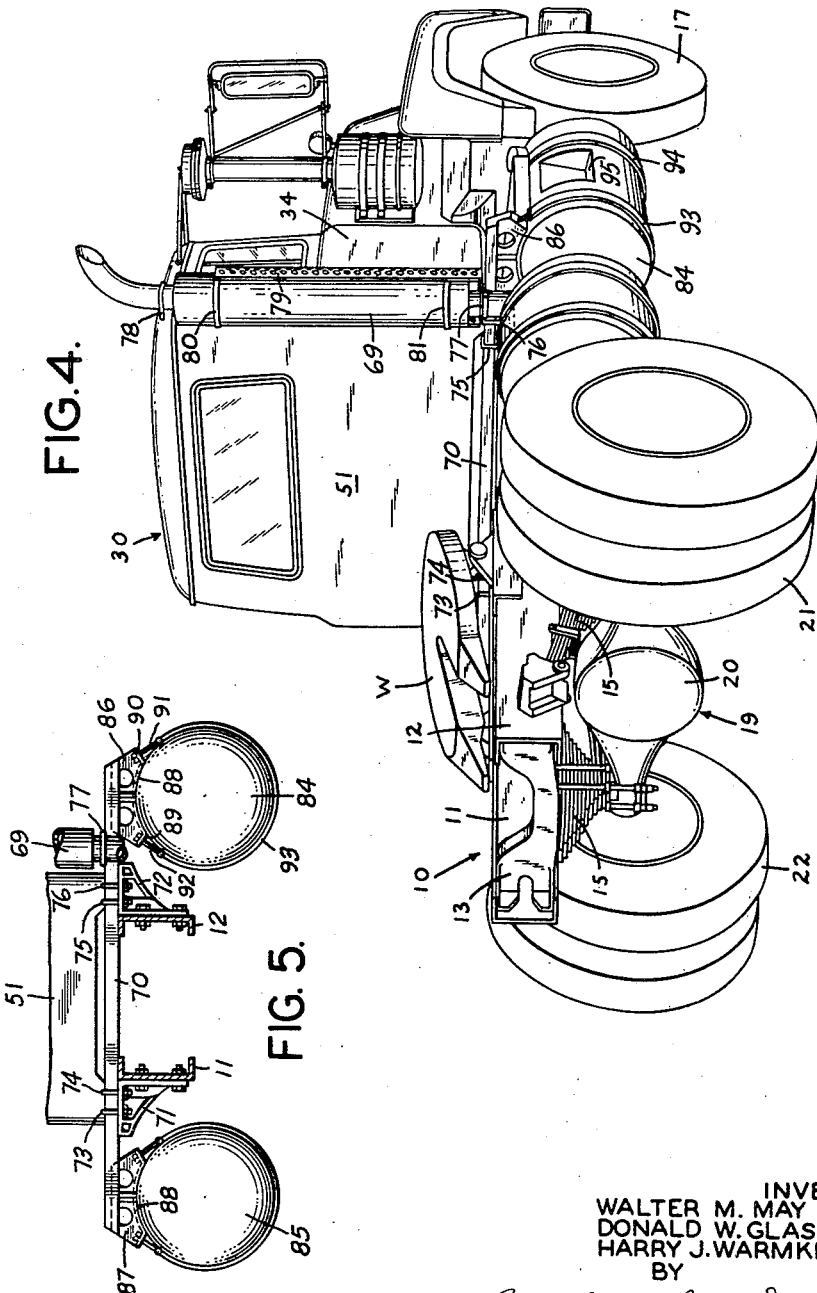
INVENTORS:
WALTER M. MAY
DONALD W. GLASENAPP
HARRY J. WARMKESSEL
BY
THEIR ATTORNEYS

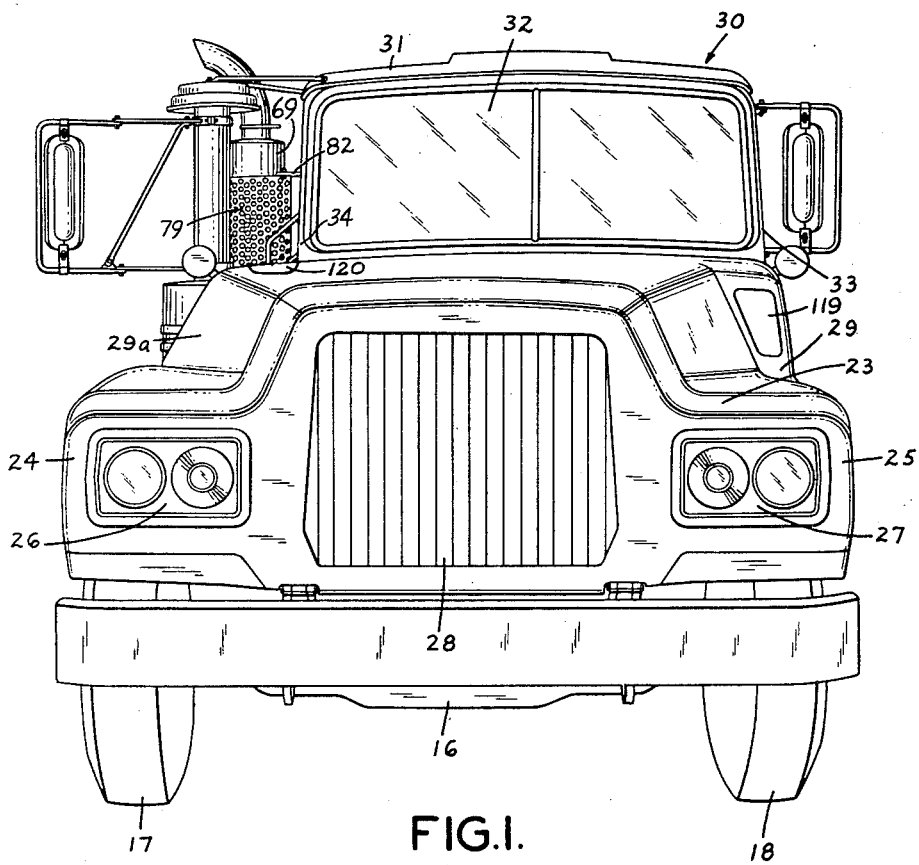

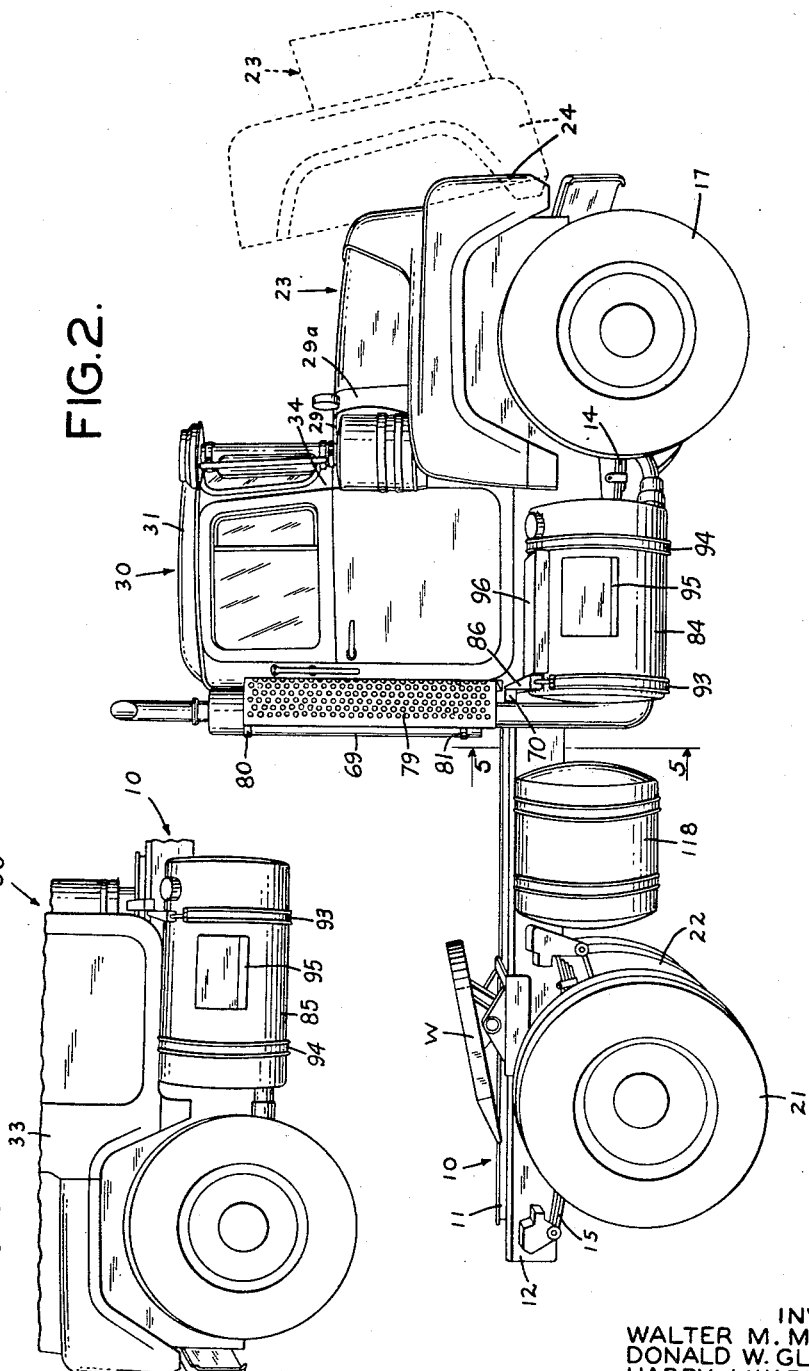

United States Patent Office 3,177,969
Patented Apr. 13, 1965

3,177,969
FUEL TANK AND REAR CAB SUPPORT
Walter M. May, Allentown, Pa., Donald W. Glasenapp, Rochester, Mich., and Harry J. Warmkessel, Allentown, Pa., assignors to Mack Trucks, Inc., Plainfield, N.J., a corporation of New York
Original application Feb. 20, 1962, Ser. No. 174,426. Divided and this application May 1, 1963, Ser. No. 277,314
3 Claims. (Cl. 180—89)

This invention relates to improvements in motor vehicles, and it relates particularly to improvements in fuel tanks and rear cab supports in trucks and tractors for tractor-trailer combinations.

This application is a division of our copending application Serial No. 174,426, filed on February 20, 1962, for a "Motor Vehicle."

The design and production of truck-type vehicles, especially tractor trucks, is limited and hampered by many factors beyond the control of the engineer and the manufacturer. Almost all states have laws governing and limiting the over-all length, width and load-carrying capacity of trucks and tractor-trailer combinations. In order to carry the maximum cargo within the limits provided by law, the trailer must be as long as possible with the result that the over-all length of the driver's cab and the hood, if any, on the vehicle must be kept at a minimum.

With the large displacement, high-torque engines required in such tractors, it has been difficult to keep the over-all length and width of the cab within the maximum limitations available. One solution has been to mount the cab of the vehicle over the engine and provide a tunnel extending lengthwise of the cab in which the upper portion of the engine is housed. Access is had to the engine by mounting the cab for tilting or other movement relative to the frame. While such tilting cab structures are satisfactory and are widely used, they also are expensive for the reason that the cab must be a rigid, self-sustaining structure and expensive mechanisms must be provided for counterbalancing or raising the cab relative to the frame. Also, all controls must be flexible or capable of being disengaged to allow the cab to tilt. So long as the engine of the vehicle is relatively narrow in transverse width, e.g., an in-line engine, it can be housed in a tunnel of reasonable size on the floor of the cab while still leaving room for the driver and his assistant and for the operating controls of the cab.

When a different type of engine, such as a high-torque V-type engine of high-piston displacement is to be used in such a tilting cab vehicle, the problem becomes much more difficult for the reason that such engines are very wide and while they may be lower in over-all height, they require such a wide tunnel in the cab that the space for the driver and his assistant is greatly reduced. The cab cannot be made sufficiently wide to compensate fully for the wider tunnel due to width regulations. Moreover, if the cab is made wider, less space is available for such externally-mounted accessories as the air cleaner for the engine, the exhaust stack, side-view mirrors and the like, which are essential to the operation of the vehicle.

In accordance with the present invention a truck or tractor vehicle is provided which overcomes the disadvantages of the vehicles referred to above and enables a V-type, large piston displacement and high-torque engine to be used while keeping the over-all length and width of the cab and associated elements within the limits imposed by state regulations and maximum trailer length.

In order to reduce the load carried by the cab and thus simplify its structure and reduce its weight and cost, the vehicle is provided with a cross-frame member adjacent the back panel of the cab and mounted on the frame of the vehicle, the cross-frame member having its ends extending outwardly beyond the frame and serving to support the rear of the cab and the fuel tanks for the engine of the vehicle on one or both sides of the frame below the cab. The cross-frame member also supports the exhaust stack for the engine and thus disposes it within the area available for the cab and in a position to direct the exhaust gases away from the cab.

Additional space is conserved by forming the steps for entering the cab in and on the gas tanks.

Other features and advantages of the structure will be apparent from the following description and accompanying drawings in which:

FIGURE 1 is a front elevational view of a typical tractor truck embodying the present invention;

FIGURE 2 is a side elevational view of the vehicle;

FIGURE 3 is a side elevation of a portion of the vehicle viewed from the opposite side than that of FIGURE 2;

FIGURE 4 is a rear perspective view of the vehicle; and

FIGURE 5 is a view in section taken on line 5—5 of FIGURE 2.

The vehicle chosen for purposes of illustration of the present invention is a tractor for hauling a trailer of the box or other type. As illustrated, the vehicle includes a strong frame 10 made up of a pair of longitudinally extending channel members 11 and 12 with suitable cross bracing members 13, etc., spaced along the length of the frame. The vehicle may have any desired type of suspension, such as, for example, leaf springs 14 and 15 mounting respectively, the front axle 16 and the front steering wheels 17 and 18 and a rear axle 19 including a differential 20 and having single or dual wheels 21 and 22. Any suitable type of shackles or supports for mounting of springs on the frame may be used. Any suitable type of propeller shaft and transmission may be provided for driving the rear wheels, as may be desired.

In the tractor illustrated, a high piston displacement, high torque spark or compression ignition V-8 engine together with its accessories, not shown, is mounted at the forward portion of the frame.

As best shown in FIGURES 1 and 2, the engine and the radiator therefor are housed in a unitary assembly of a hood 23 and fenders 24 and 25 in which the headlights 26 and 27, radiator shutter 28 and the like are mounted. The hood and fender assembly may be formed of metal but preferably the entire assembly is molded of resin-bonded fiberglass to conserve weight and to provide a rigid and vibration-resistant structure of good heat-insulating and sound absorbing characteristics. The shapes of the hood and the fenders can be modified as desired.

The hood merges into a cowl portion 29 on the front of the driver's cab 30 and is movable relative to the cab, as shown in dotted lines in FIGURE 2 to uncover the radiator and engine of the vehicle for servicing or repair. The top 31 and the windshield 32 of the cab 30 are offset from the longitudinal center line of the frame and the engine as viewed in FIGURE 1. The side panel 33 of the cab 30 on the driver's side is disposed about in the plane of the outer edge of the left-hand fender 25, while the side panel 34 of the cab 30 on the assistant driver's side is disposed about in a vertical plane containing the outside of the frame channel member 12. Both side panels of the cab 30 are provided with the doors to permit entry and exit from the cab.

A V-type engine is substantially shorter in over-all length than an in-line engine of the same displacement or torque output so that the hood 23 can be relatively short in a fore-and-aft direction thereby permitting the cab to be made long enough to provide space therein for the seats for the driver and the assistant driver and the controls for the vehicle. With this arrangement, the overall length from the front of the hood to the back panel 51 of the cab can be kept within space limitations determined by state regulations governing the over-all length of a tractor and trailer.

Large displacement engines require large capacity and size exhaust stacks and mufflers. They usually are mounted so that the exhaust gases are discharged above the top of the cab to keep the exhaust gases away from the road and from other vehicles traveling therealong.

In accordance with the present invention, a muffler and exhaust stack 69 is mounted ahead of the trailer swing arc and behind and on the right-hand side of the vehicle as viewed in FIGURE 4 to the rear of the assistant driver's door (see FIGURES 2 and 4). In order to support the muffler and the rear of the cab without putting an unnecessary strain on the cab, a tubular cross-frame member 70 is mounted on top of the frame 10 by means of angle brackets 71 and 72 and U-bolts 73, 74, 75 and 76 engaging in the angle brackets 71 and 72. Opposite ends of the cross-frame member 70 project outwardly beyond the frame members 11 and 12. One end of the frame member 70 on the assistant's side of the cab supports the lower end of the muffler and exhaust stack 69. U-bolts 77, straps or the like connect the stack 69 to the member 70 so that substantially all of the weight of the exhaust stack is carried thereby. For stability, the upper end of the stack is also supported by means of a flexible strap 78 secured to the cab at the roof or adjacent thereto. A shield or guard of perforated metal 79 is mounted in spaced relation to the front and outside of the stack 69 to prevent the assistant driver from being burned when he enters or leaves the cab. The shield 79 may be mounted on the exhaust stack 69 by means of straps 80 and 81 and by means of bracket 82 secured to the cab (FIGURE 1).

Fuel tanks 84 and 85 are supported on opposite sides of the vehicle frame 10 below the cab 30. As best shown in FIGURE 5, each end of the frame member 70 carries brackets 86, 87 which are bolted or welded thereto and have an arcuate undersurface 88 conforming to the shapes of the tanks 84 or 85. Each bracket is provided with flanges 89 and 90 around its periphery to receive bolts 91 and 92 and provide seats for the nuts on the bolts to tighten a metal hoop or strap 93 around the rear end of each tank.

The front end of each tank is supported by means of other hoops or straps 94 secured to conventional saddle type brackets in turn mounted to the frame members of the vehicle. In this way, large-capacity fuel tanks for the vehicle can be supported from the frame and the cross-frame member outboard of the frames and within the frontal area of the cab. Moreover, as shown in FIGURES 2, 3 and 4, steps 95 may be formed by welding suitable plates and gussets in an opening in each tank. A second step 96 may be secured to the frame or to the top of the tank almost flush on the right-hand side of the vehicle.

The tractor frame 10 is, as illustrated, provided with a conventional fifth wheel W and it also carries an air tank 118 for storing air for the brake system and the like.

Appropriate ventilating means may be provided for the cab and such other changes as may be necessary may be made in the vehicle to facilitate its use and improve its comfort for the drivers. As shown in FIGURE 1, a ventilator 119 in the cowl 29 may be provided on the driver's side. This ventilator together with the offset relation of the engine hood keeps the driver's feet and legs cool. A fresh air inlet 120 which may be connected to the heater is provided in the cowl portion 29a.

It will be understood that many components of the vehicle are susceptible to wide modification, as, for example, the spring suspension, the type of engine and transmission, the details of structure and design and appearance of the hood, cab and the like. Accordingly, the vehicle described herein should be considered as illustrative and not as limiting the scope of the following claims.

We claim:

1. A vehicle comprising a vehicle frame, a driver's and assistant driver's cab mounted on and extending at least across the width of said frame, an engine mounted on said frame adjacent to the front of said cab, a cross-frame member mounted on said frame adjacent to the back of said cab having at least one end extending outwardly beyond said frame and one side of said cab, a fuel tank for said engine, means connecting one end of said tank to and suspending it from said one end of said cross-frame member, means connecting the other end of said tank to and suspending it from said frame in front of said cross-frame member, a substantially vertical exhaust stack for said engine, and means on said cross-frame member and said cab supporting said exhaust stack thereon adjacent to a back corner of said cab at the junction of the back and said one side of said cab.

2. A vehicle comprising a vehicle frame, a driver's and assistant driver's cab mounted on said frame and extending at least the width of said frame, an engine mounted on said frame adjacent to the front of said cab, a cross-frame member mounted on said frame adjacent to the back of said cab and having opposite ends projecting outwardly beyond the sides of said frame, fuel tanks on opposite sides of said frame and extending therealong below said cab, means suspending the rear ends of said tanks from said projecting ends of said cross-frame member, means suspending the front ends of said tanks from said frame, an exhaust stack for said engine, and means on said cross-frame member adjacent to one end thereof and on said cab supporting said stack in substantially a vertical position adjacent to a back corner of said cab.

3. The vehicle set forth in claim 2 in which the means suspending the rear ends of said tanks on said cross-frame member comprises brackets mounted on the ends of said cross-frame member and having undersurfaces substantially complemental to the tops of said tanks and straps extending around said tanks and secured to said brackets for retaining said tanks in engagement with said undersurfaces of said brackets.

References Cited by the Examiner

UNITED STATES PATENTS

| 2,314,298 | 3/43 | Welch | 280—5 |
| 2,769,501 | 11/56 | Wagner | 180—89 X |
| 2,845,133 | 7/58 | Norrie et al. | 180—89 X |

FOREIGN PATENTS

| 636,586 | 2/62 | Canada. | |

A. HARRY LEVY, *Primary Examiner.*